3,413,132
LIGHTWEIGHT CERAMIC PRODUCT AND
METHOD OF MAKING
John H. Fishwick, West Chester, Pa., assignor to Foote Mineral Company, Exton, Pa., a corporation of Pennsylvania
No Drawing. Filed Nov. 6, 1963, Ser. No. 321,660
13 Claims. (Cl. 106—40)

ABSTRACT OF THE DISCLOSURE

Foamed, lightweight ceramic products, of high strength, thermal shock resistance and thermal stability, are prepared from finely-divided β-spodumene or petalite.

---

The present invention relates to a novel ceramic product and to the method of making the same; and, more particularly, the invention relates to a novel lightweight shaped ceramic body having high strength, thermal shock resistance and dimensional stability (low co-efficient of thermal expansion).

There is need for a ceramic product which, while relatively light in weight (density of 1.2 g./cc. or less), has high strength and dimensional stability and possesses thermal shock resistance, that is the ability to withstand wide fluctuations in temperature (several hundred degrees) in short periods of time (seconds or minutes). A product with such characteristics would find use in making molds for casting non-ferrous metals and alloys, in fabricating large ceramic tools as for the simultaneous brazing and heat treating of high temperature alloys, in building kiln furniture, such as saggers and supporting members, and as insulating bricks where thermal shock resistance is required.

The standard lightweight ceramic product with thermal shock resistance and dimensional stability is prepared from a foamed, fused silica slip. According to J. D. Walton, "Fused Silica Ceramics: Part I," Ceram. Age. 77, 52–58 (1961), such a product has a density of 0.5–0.7 g. cm.$^3$, a coefficient of thermal expansion of $0.54 \times 10^{-6}$ in./in./°C. and a modulus of rupture of 200–500 p.s.i. As will appear hereinafter, products of the present invention may have a substantially higher strength. A further disadvantage of fused silica is that it devitrifies to cristobalite at about 1100° C. Cristobalite inverts with accompanying volume changes at about 230° C., making cyclic operations undesirable after prolonged heating above 1100° C.

Ceramic bodies made from lithium aluminosilicates, like β-spodumene and petalite, are known to possess high thermal shock resistance and dimensional stability. Hummel Reissue Patent No. 24,795 discloses such a product which, however, is dense and heavy.

It is the principal object of the present invention to provide a novel lightweight, thermally shock-resistant ceramic product.

It is another object of the present invention to provide a lightweight thermally shock-resistant ceramic product, such as in the form of a brick, having high strength and high dimensional stability.

A further object of the present invention is to provide a method for making the described lightweight ceramic product.

Other objects will become apparent from a consideration of the following specification and the claims.

The present invention is based on the discovery that if extremely finely-divided β-spodumene or petalite (substantially through 325 mesh) is prepared as a foamed slip, shaped, dried and fired, as hereinafter set forth, a foamed or porous ceramic product is formed which has the advantageous characteristics referred to; namely, lightweight, high strength, high thermal shock resistance and high dimensional stability. β-spodumene and petalite are lithium aluminosilicates having $Li_2O:Al_2O_3:SiO_2$ ratios of 1:1:4 and 1:1:8, respectively. Upon calcination, α-petalite is converted to β-spodumene-silica solid solution. Hence, the solids in the product of the present invention will consist essentially of (a) β-spodumene as such when β-spodumene is used as the starting material, or (b) β-spodumene-silica solid solution when petalite is used as the starting material. Of course, if a mixture of β-spodumene and petalite is used, the product will contain a blend of each of (a) and (b). In preparing the foamed slip, a conventional foaming agent (usually organic) and a foam stabilizer are used, and minor amounts of finely-divided clay, a fluxing agent, and the like may be, but are not necessarily, included.

Thus, the product of the present invention is a shaped ceramic body having a continuous phase consisting essentially of sintered particles, substantially through 325 mesh, of at least one lithium aluminosilicate selected from the group consisting of β-spodumene having a $$Li_2O:Al_2O_3:SiO_2$$

ratio of 1:1:4 and β-spodumene-silica solid solution having a $Li_2O:Al_2O_3:SiO_2$ ratio of 1:1:8, the continuous phase being interrupted throughout the body by void spaces providing a porosity in the body of between about 50 and about 70%.

The described product will have a linear thermal expansion coefficient ranging from about 0.33 to about $0.7 \times 10^{-6}$ in./in./° C. (from room temperature to 300° C.) and ranging from about 0.65 to about $1.2 \times 10^{-6}$ in./in./° C. (from room temperature to 600° C.). The modulus of rupture (MOR) of the body will range from about 290 to about 1800 p.s.i., and the crushing strength will range from about 800 to about 10,000 p.s.i., the MOR and crushing strength depending primarily upon the firing conditions employed. The density of the product will range from about 0.8 to about 1.2 g./cc.

The product is prepared by foaming an aqueous ceramic slip in which the solids consist essentially of particles, substantially through 325 mesh, of at least one lithium aluminosilicate selected from the group consisting of β-spodumene and petalite, shaping (forming or casting) and drying the foamed slip and then firing the shaped body at from Orton cone 5 to cone 12.

The principal material used in preparing the present product is, as stated, β-spodumene or petalite. The former contains a $Li_2O:Al_2O_3:SiO_2$ ratio of 1:1:4 and the latter contains a like ratio of 1:1:8. Calcination of α-petalite converts it to β-spodumene containing the excess silica in solid solution. This conversion may and preferably does, take place during the firing step of the present process when α-petalite is used as starting material. However, α-petalite may initially be calcined, and the calcined petalite then used as starting material. Of the two lithium aluminosilicates, β-spodumene itself is the preferred material.

The particle size of the lithium aluminosilicate has been found to be a critical feature in accordance with the present invention. Thus it should be substantially through 325 mesh, that is to say crushed lithium aluminosilicate should be milled until the particle distribution is such that at least 85% passes through a 325 mesh screen. The finer the particle size, the better the advantageous characteristics of the product, and hence it is preferred that at least 90% of the material passes through a 325 mesh screen.

A minor portion of the lithium aluminosilicate may be replaced by a finely-divided clay, that is a clay having a particle size similar to that described above for the lithium aluminosilicate. The amount of clay employed may depend somewhat upon the purity thereof. Essentially pure $Al_2O_3 \cdot 2SiO_2 \cdot 2H_2O$ clays, such as kaolin, are refractory, that is to say, a shaped body thereof will maintain its form (will not slump) when heated to cone 33. Such refractory clays may make up something less than about 25% of the solids of the present product. A less refractory clay, like ball clay, while imparting enhanced green strength, is desirably kept at not over about 10% of the solids. The use of clay is not a necessary feature of the present invention since it does not alter materially the otherwise advantageous features of the product, but its use is preferred since it serves to replace more expensive lithium aluminosilicate and can enhance the green strength of the dried, but unfired, body.

A minor amount, generally not over about 2%, of a fluxing agent such as talc may also be included. However, a fluxing agent is not necessary. Likewise, in accordance with conventional practice a small amount of an auxiliary green strength binder, like polyvinyl alcohol, or of a deflocculating agent, like sodium silicate, may be, but is not necessarily, used. In this connection, complete deflocculation is not desired.

As is conventional in making foamed ceramic products, a foaming agent will be employed. Such foaming agents are usually anionic surfactants or wetting agents, examples of which are the sodium and ammonium salts of a sulfate ester of an alkyl phenoxy polyoxyethylene ethanol; complex fatty amide compounds; alkyl aryl sulfonates, like sodium mono- and di-amyl naphthalene sulfonates; coconut acid ester of sodium isethionate; salts of fatty alkyl sulfates, like the sodium-, potassium, ammonium- and triethanolamine lauryl sulfates; salts of dialkyl sulfosuccinates, like sodium dioctyl sulfosuccinate, and the like. Since these materials are organic, they will become decomposed during firing and will not be present in the product. While it is preferred that the foaming agent be substantially neutral, that is provide a pH in water of about 6–8, this is not necessary since the pH of the slip, which is desirably no greater than about 8 and no lower than about 4, can readily be adjusted, usually by the addition of acid. Any acid or acidic material, like hydrochloric, sulfuric, acetic, nitric, phosphoric, and the like, acids may be used.

In preparing the product of the present invention there will also be used a minor amount, less than 1%, by weight, based on the weight of the solids, of a foam-stabilizing agent. The presently preferred foam-stabilizing agent is colloidal alumina. Such colloidal alumina is disclosed in U.S. Patent No. 2,915,475 as fibrous alumina in the form of fibrils having an average length of from 100 to 1500 millimicrons, the remaining average dimensions being in the range from 3 to 15 millimicrons, and an axial ratio of from 20:1 to 300:1; the product also having a surface area of from 200 to 400 m.$^2$/g. and the X-ray diffraction of boehmite with the ratio of peak intensities of the product to boehmite of a surface of less than 10 m.$^2$/g. at the 020 crystal lattice plane being less than 40:100. A preferred colloidal alumina is "Baymal" colloidal alumina of E. I. du Pont de Nemours & Co. which, according to the manufacturer's literature, is a free-flowing powder consisting of clusters of minute fibrils of boehmite (AlOOH) alumina. The surface of the fibrils of this material is modified with adsorbed acetate ions providing a typical chemical composition of: AlOOH, 84.7%; $CH_3COOH$, 8.5%; $SO_4$, 1.76%, and water, 2.7%. The surface area of this material is 274 m.$^2$/g.

Referring more specifically to the proportions of the materials in the present product when the lithium aluminosilicate and an inorganic foam-stabilizing agent, like colloidal alumina, are the only inorganic materials used in preparing the product, the content of the former in the product may reach as high as about 99.9%, by weight, based on the weight of the product, the content of the latter being less than 1% and as low as 0.1%. Usually, however, the amount of colloidal alumina employed is not over 0.5%, between about 0.2 and about 0.4% being preferred. The amount of foaming agent employed will, of course, be dictated by the particular foaming agent selected and its ability to foam the slip to the extent providing the porosity in the product as described hereinabove. When clay is used, it will, as stated, be less than about 25% and is preferably not over about 20%, the lithium aluminosilicate and foam-stabilizing agent making up the balance. In the preferred product where clay is used, the lithium aluminosilicate will make up at least about 80% of the solids, and preferably at least about 90% when the clay is non-refractory clay, like ball clay. The foregoing proportions are based on the dry solids in the product. In preparing the product, water is incorporated with the solids to provide a slip or pourable slurry. The amount of water employed for this purpose results in a solids content in the slip of between about 60 and about 70%, by weight, based on the weight of the slip.

Referring then more particularly to the preparation of the ceramic product of the invention, broadly speaking a slip of the materials is first foamed. This is accomplished by aerating the slip as by beating air into it as with a high speed mixer, a foam whipper or other device capable of entraining mechanically air bubbles within the slip mass. Aeration may, and preferably does, commence while the ingredients are being mixed to form the slip. For example, in accordance with a preferred procedure the foam stabilizer and at least a portion of the foaming agent are added to the water. Then the mixture is aerated while the remaining materials are added so that by the time all the materials are mixed in the slip, the slip has been foamed substantially. Aeration may be continued until a point is reached where further beating results in little or no significant further foaming.

The foamed slip is then shaped, as by molding, and dried. Generally speaking, the mold may be made from a wide variety of materials including plaster of Paris, cardboard, and the like. Since drying involves removal of water from the shaped foamed slip and desirably from all surfaces thereof, the sides and bottom of the mold should be capable of absorbing water. Cardboard has been found especially suitable for this, particularly when held in a perforated metal support. The time required for drying will depend upon the size of the shaped body, large bodies requiring several hours. Heat may be used to assist drying, and during initial stages of drying the temperature should be held below the boiling point of water, preferably around 120–160° F. After most of the water has been removed, the temperature may be raised above the boiling point.

The dried shaped body, either while still in the mold or after removal from the mold—or even after simply removing the side walls of the mold, is then fired to sinter the lithium aluminosilicate particles. This involves an interchange of atoms between the particles of lithium aluminosilicate to provide a ceramic bond therebetween. This interchange of atoms may be promoted by the addition of a small amount of a mineralizer, such as talc, or by the presence of minor impurities in the spodumene, like feldspar and/or mica. Actual fusion of the surface of the particles may or may not take place. The exact time-temperature conditions required for sintering will depend in part, upon the presence or absence of fluxing agents. Thus, talc and a non-refractory clay, like ball clay, tend to reduce the firing temperature required. At any rate firing will take place at from cone (Orton) 5 to cone 12, with firing in the neighborhood of cone 10 being preferred.

The resulting product, following cooling and any finishing, such as cutting or surface grinding, is then ready for use. It consists of a continuous phase which consists essentially of the sintered particles of lithium aluminosilicate. When an inorganic foam stabilizer, like colloidal alumina, is used, it will be present in this continuous phase. Clay and/or a fluxing agent, like talc, to the extent either or both of these is used will also be present in this continuous phase. Interrupting the continuous phase are void spaces or bubbles, and these are dispersed substantially uniformly but randomly throughout the continuous phase. These void spaces or bubbles may be interconnected by passageways since water will in time permeate the body. Magnification of a cross-section of the product shows a sponge-or foam-like structure. The void spaces provide a porosity of between about 50 and about 70%; that is, between about 50 and about 70% of the total volume of the product is void space. Thus, the product has a relatively low density for a ceramic, and the density may range between about 0.8 and about 1.2 g./cc. Most unexpected, however, are the unusually high strength and thermal shock resistance, as are evident from the specific examples and data which follow.

The following examples are given for the purposes of illustration only and are not intended to limit the scope of the invention in any way.

Example I

β-Spodumene is prepared by calcining −20 mesh ceramic grade α-spodumene. The resulting material is milled for 3 hours and the −50 mesh fraction is recovered by screening. The −50 mesh fraction is then milled for 20 hours. The particle size distribution of the resulting material is such that 95% passes through a 325 mesh screen.

Eight grams of colloidal alumina ("Baymal" colloidal alumina as described hereinabove) are dispersed in 1200 ml. of demineralized water by pouring it into the vortex formed by a paddle mixer, and 2 mls. of a 75% aqueous solution of sodium dioctyl sulfosuccinate ("Aerosol OT," of American Cyanamid Co.) are then added. 2300 gs. of a mixture of 95%, by weight, of the β-spodumene (95% through 325 mesh) and 5% of ball clay are then added while continuing stirring.

The resulting foamed slip is cast into a perforated steel mold (4½" x 9" x 3½") lined with unbleached cotton muslin. The brick thus formed is dried at 140–230° F., and, after removing the mold sides, fired to cone 10.

The product has the following properties:

Density (g./cc.) ---------------------------- 1.0
Thermal exp. (in./in./° C.×10$^{-6}$):
 R.T. −300° C. ---------------------------- 0.33
 R.T. −600° C. ---------------------------- 0.67
Crushing strength (p.s.i.) ------------------ 6072
Modulus of rupture (p.s.i.) ----------------- 1245

Example II

β-Spodumene prepared as in Example I is combined with kaolin (100% through 325 mesh) and powdered talc into a slip, according to the procedure which follows, in a weight ratio of 88 parts β-spodumene, 10 parts kaolin and 2 parts talc. In preparing the slip, 7.5 g. of colloidal alumina ("Baymal" colloidal alumina as described hereinabove) and 6 g. of powdered polyvinyl alcohol are dispersed in 1200 ml. of water, and 20 ml. of a neutral anionic surface active (foaming) agent (Mearl SW 2336 of Mearl Chemical Co.) are then added. The β-spodumene, kaolin and talc are then added while the mixture is being beaten. The remainder (12 ml.) of the foaming agent is added. The combined dry weight of the β-spodumene, kaolin and talc is 2300 g.

The slip is poured into 9" x 4½" x 2½" plaster of Paris molds coated with powdered graphite. The body is then dried in the mold at room temperature for 12 hours, removed from the mold, dried for an additional 12 hours at room temperature and finally heated slowly from 150 to 250° F. over a period of 12 hours to complete drying.

The dried body is then fired at cone 10.

The product has the following properties:

Density (g./cc.) ---------------------------- 0.99
Thermal exp. (in./in./° C.×10$^{-6}$):
 R.T. −300° C. ---------------------------- 0.47
 R.T. −600° C. ---------------------------- 0.88
Crushing strength (p.s.i.) ------------------ 5510
Modulus of rupture (p.s.i.) ----------------- 1276

Examples III–X

In these examples, the use of petalite is illustrated as well as various other proportions of materials. The procedure employed in preparing the bricks is the same as used in Example II except for the variations in proportions and except for the particle size of the β-spodumene (used in Examples III–VI) which is 90% through 325 mesh. The petalite (used in Examples VII–X) is α-petalite and has a particle size 96% through 325 mesh obtained by milling −200 mesh α-petalite for 10 hours.

In Examples III and IV, the weight ratio of β-spodumene:kaolin:tac is 88:10:2 and 7.5 g. of the colloidal alumina and 32 ml. of the foaming agent are used. In Examples V and VI the weight ratio of β-spodumene:kaolin:talc is 78:20:2, and 6.0 g. of the colloidal alumina and 40 ml. of the foaming agent are used. In Examples VII and VIII the weight ratio of petalite:kaolin:talc as 88:10:2, and 4.0 g. of the colloidal alumina and 27 ml. of the foaming agent are used. In Examples IX and X the weight ratio of petalite:kaolin:tac is 78:20:2, and 4.0 g. of the colloidal alumina and 39 ml. of the foaming agent are used. In Examples III, V, VII and IX, the bodies are fired to cone 7 and in Examples IV, VI, VIII and X the bodies are fired to cone 10.

The results are set forth in the following table:

| Example | Density (g./cc.) | Thermal Exp. (in./in./°C. × 10$^{-6}$) | | Crushing strength (p.s.i.) | Modulus of rupture (p.s.i.) |
|---|---|---|---|---|---|
| | | R.T. −300° C. | R.T. −600° C. | | |
| III | 0.99 | 0.48 | 0.92 | 1,445 | 501 |
| IV | 1.03 | 0.44 | 0.79 | 4,870 | 1,052 |
| V | 1.00 | 0.58 | 1.03 | 4,070 | 1,021 |
| VI | 1.00 | 0.70 | 1.11 | 4,185 | 1,234 |
| VII | 0.88 | 0.66 | 1.41 | 852 | 292 |
| VIII | 0.93 | 0.36 | 0.65 | 3,450 | 1,082 |
| IX | 0.84 | 0.62 | 1.16 | 806 | 391 |
| X | 1.02 | 0.50 | 0.86 | 4,435 | 913 |

Example XI

In this example, the procedure of Example II is followed using, however, ball clay instead of kaolin and omitting the talc. The weight ratio of β-spodumene:ball clay is 95:5.

The resulting brick, upon firing at cone 10, has the following characteristics.

Density (g./cc.) ---------------------------- 1.2
Thermal exp. (in./in./° C.×10$^{-6}$):
 R.T. −300° C. ---------------------------- 0.36
 R.T. −600° C. ---------------------------- 0.78
Crushing strength (p.s.i.) ------------------ 9747
Modulus of rupture (p.s.i.) ----------------- 1736

Modification is possible in the selection of additives and amounts thereof as well as in techniques and procedures employed without departing from the scope of the invention.

I claim:

1. As a new article of manufacture a shaped foamed ceramic body consisting essentially of a continuous phase and bubble-like void spaces dispersed therethrough, said continuous phase consisting essentially of sintered particles, substantially through 325 mesh, of at least one lithium aluminosilicate selected from the group consisting of β-spodumene having a $Li_2O:Al_2O_3:SiO_2$ ratio of 1:1:4 and β-spodumene-silica solid solution having a

ratio of 1:1:8, and containing colloidal alumina in an amount less than 1% by weight of the solids, and said void spaces providing a porosity in the body of between about 50 and about 70% and a density of the body of between about 0.8 and about 1.2 g./cc.

2. The product of claim 1 wherein at least 75% of the solids in said body is said lithium aluminosilicate.

3. The product of claim 2 wherein less than 25% of the solids in said body is clay having a particle size substantially through 325 mesh.

4. The product of claim 3 wherein said clay is a refractory clay.

5. The product of claim 4 wherein said refractory clay is kaolin.

6. The product of claim 3 wherein ball clay is present in an amount not over 10% of the solids.

7. The product of claim 1 wherein said lithium aluminosilicate is β-spodumene.

8. The product of claim 1 wherein the colloidal alumina is present in amount between about 0.1 and about 0.5%.

9. As a new article of manufacture a shaped foamed ceramic body consisting of a continuous phase and bubble-like void spaces dispersed therethrough, said continuous phase consisting essentially of sintered particles, at least 90% through 325 mesh, of at least one lithium aluminosilicate selected from the group consisting of β-spodumene having a $Li_2O:Al_2O_3:SiO_2$ ratio of 1:1:4 and β-spodumene-silica solid solution having a $Li_2O:Al_2O_3:SiO_2$ ratio of 1:1:8 in an amount of at least 75% by weight of the solids; clay particles, at least 90% through 325 mesh, in an amount less than about 25% by weight of the solids, and colloidal alumina in an amount less than 1% but greater than 0.1% by weight of the solids; and said void spaces providing a porosity in the body of between about 50 and about 70% and a density of the body between about 0.8 and about 1.2 g./cc.

10. The product of claim 9 wherein said lithium aluminosilicate is β-spodumene, and therein said colloidal alumina is in an amount less than 0.5%.

11. The method of making a light-weight thermal shock resistant ceramic body of high strength which comprises foaming an aqueous ceramic slip in which the solids consist essentially of particles, substantially through 325 mesh, of at least one lithium aluminosilicate selected from the group consisting of β-spodumene and petalite, and containing colloidal alumina in an amount less than 1% by weight of the solids, shaping and drying the foamed slip and then firing the shaped body at from Orton cone 5 to cone 12.

12. The method of claim 11 wherein said lithium aluminosilicate is β-spodumene.

13. The method of claim 11 wherein there is present, in said slip, clay in an amount less than 25% by weight of the solids.

References Cited

UNITED STATES PATENTS

| | | | |
|---|---|---|---|
| 3,174,870 | 3/1965 | Connelly et al. | 264—44 |
| 3,272,686 | 9/1966 | Smith et al. | 264—43 |
| 3,041,190 | 6/1962 | Griffith et al. | 106—40 |
| 3,202,518 | 8/1965 | Whittemore | 106—40 |
| 3,258,349 | 6/1966 | Scott | 106—41 |
| 3,288,615 | 11/1966 | Estes et al. | 106—40 |

HELEN M. McCARTHY, *Primary Examiner.*